W. J. KENNEDY.
SALT HOLDING DEVICE FOR ANIMALS.
APPLICATION FILED MAY 17, 1916.
1,225,645.
Patented May 8, 1917.
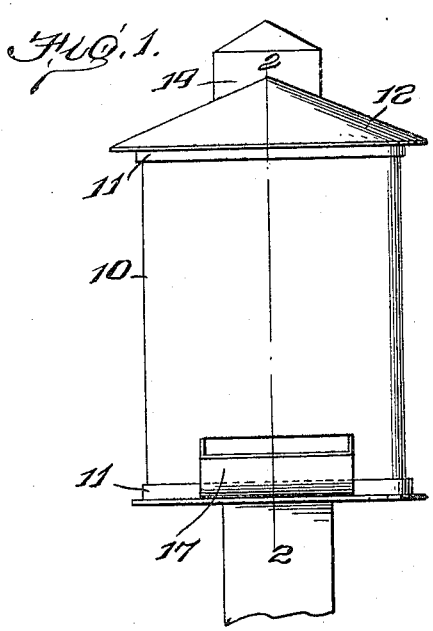
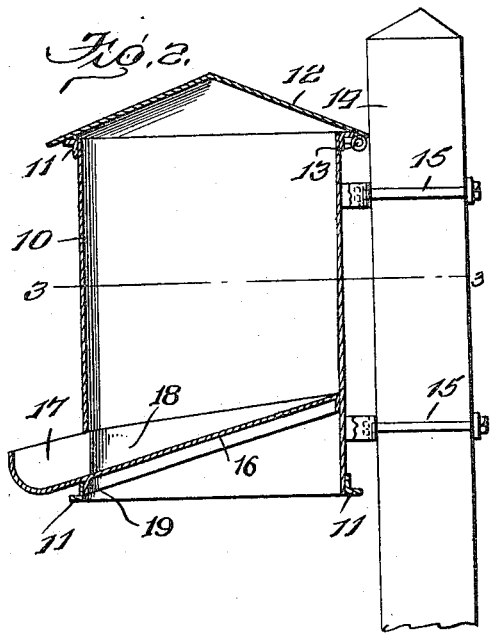
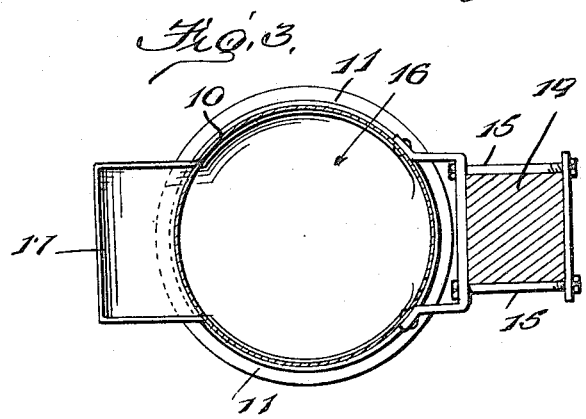
Inventor
W. J. Kennedy.
By
Attorneys

UNITED STATES PATENT OFFICE.

WILLIAM J. KENNEDY, OF FAIRFIELD, IOWA.

SALT-HOLDING DEVICE FOR ANIMALS.

1,225,645.   Specification of Letters Patent.   Patented May 8, 1917.

Application filed May 17, 1916. Serial No. 98,132.

*To all whom it may concern:*

Be it known that I, WILLIAM J. KENNEDY, a citizen of the United States, residing at Fairfield, in the county of Jefferson and State of Iowa, have invented certain new and useful Improvements in Salt-Holding Devices for Animals, of which the following is a specification.

This invention relates to improvements in devices for storing salt and like commodities in convenient position for supplying animals with salt, and maintaining the salt in readily accessible position for the animals, while at the same time protecting the salt from waste and deterioration.

Another object of the invention is to provide a simply constructed device of this character whereby the salt or other commodity is protected from the elements while at the same time readily accessible to the animals.

With these and other objects in view, the invention consists in certain novel features of construction, as hereinafter shown and described and then specifically pointed out in the claims; and in the drawings illustrative of the preferred embodiment of the invention—

Figure 1 is a front elevation of the improved device;

Fig. 2 is a vertical section on the line 2—2 of Fig. 1;

Fig. 3 is a transverse section on the line 3—3 of Fig. 2.

Corresponding and like parts are referred to in the following description and indicated in all the views of the drawings by the same reference characters.

The improved device comprises a receptacle for the salt or other commodity and comprises a shell portion 10, preferably of metal, such as aluminum or the like, which is not liable to corrosion from salt, and reinforced at the ends by bands 11, preferably of L-shaped metal, as shown. The shell and the reinforcing member 11 are preferably circular, but may be of other shape if preferred. The shell 10 is provided with a cover 12 preferably conical so that it will shed moisture and preferably hinged, as shown at 13, to the upper reinforcing member 11, as shown in Fig. 2. The shell 10 with its attachments is designed to be supported in any suitable manner, preferably from a post or like support 14, as shown, by clamp devices 15. The improved device may likewise be attached to a tree, fence, wall of a building, or other support, in convenient position for the animals to be supplied.

The bottom 16 of the shell 10 is formed slanting, as shown in Fig. 2, and extending from the bottom at one side is a trough-like member 17 which projects through an opening in one side of the shell.

Rising from the upper edge of the bottom 16 is a guard device 18 which merges into the ends of the trough 17 and decreases in width toward the side of the bottom opposite to the trough. Bearing upon the inner face of the shell 10 is a rib or band 19 which supports the bottom 16 from downward displacement. When the shell 10 is cylindrical the bottom 16, being inclined, will necessarily be elliptical in outline, and the bottom, together with its guard member 18 and projecting trough 17, may be inserted into the open upper end of the shell with the trough downwardly and the latter thrust through the discharge opening in the shell and the bottom 16 forced into position upon the band 19. The salt or other commodity is deposited in the shell 10 and a portion permitted to settle into the trough-shaped member 17 in position to be readily accessible to the animals as will be obvious. The trough-shaped extension 17 permits only a relatively small quantity of the salt to settle therein, and as fast as it is used a fresh supply of salt will pass into the trough, and will flow into the trough no faster than it is used by the animals. By this means the salt is protected not only from the elements but from waste and will be used only as fast as required. The parts with which the salt comes in contact will be noncorrosive metal such as aluminum or the like which is not affected by the action of the salt.

The improved device is simple in construction, can be inexpensively manufactured, is strong and durable and can be constructed of any required size and supported in any required locality.

Having thus described the invention, what is claimed as new is:

1. In a device of the class described, a container having a reduced opening in one side, and a bottom member for said container and inclined to the transverse plane of the same having a trough-shaped extension projecting through said opening, the bottom of the trough merging without obstruction into the bottom member.

2. In a device of the class described, a container having a reduced opening in one side, and a bottom member for said container having a trough-shaped extension projecting through said opening, said bottom member and the bottom of the trough-shaped extension being inclined to the transverse plane of the container and merging one into the other, and a guard member rising from the bottom member and bearing against the inner face of the shell.

In testimony whereof I affix my signature.

WILLIAM J. KENNEDY. [L. S.]

Copies of this patent may be obtained for five cents each, by addressing the "Commissioner of Patents, Washington, D. C."